(12) United States Patent
Ito et al.

(10) Patent No.: US 6,456,321 B1
(45) Date of Patent: Sep. 24, 2002

(54) SURVEILLANCE CAMERA APPARATUS, REMOTE SURVEILLANCE APPARATUS AND REMOTE SURVEILLANCE SYSTEM HAVING THE SURVEILLANCE CAMERA APPARATUS AND THE REMOTE SURVEILLANCE APPARATUS

(75) Inventors: Fujio Ito, Yokohama; Kenji Takahashi, Kanagawa-ken; Hiroshi Miyabe; Haruo Tagawa, both of Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/339,046

(22) Filed: Jun. 23, 1999

(30) Foreign Application Priority Data

Aug. 5, 1998 (JP) .......................................... 10-234931

(51) Int. Cl.[7] ............................................. H04N 07/18
(52) U.S. Cl. ...................................... 348/143; 348/152
(58) Field of Search ................................. 348/143–159

(56) References Cited

U.S. PATENT DOCUMENTS 5,625,410 A * 4/1997 Washino et al. ............ 348/154
5,861,905 A * 1/1999 Brummett ................... 348/143

FOREIGN PATENT DOCUMENTS

| EP | 0661885 | 7/1995 |
|----|---------|--------|
| JP | 5-298583 | 11/1993 |
| JP | 7-250322 | 9/1995 |
| JP | 8-336120 | 12/1996 |
| JP | 10-154289 | 6/1998 |
| WO | WP 94/03014 | 2/1994 |
| WO | WO 00/69168 | 11/2000 |

* cited by examiner

Primary Examiner—Andy Rao
(74) Attorney, Agent, or Firm—Lowe Hauptman Gilman & Berner, LLP

(57) ABSTRACT

Video data indicating a scene of a surveillance area is produced by a surveillance camera and is compressed to high-compressed video data and low-compressed video data. The low-compressed video data having a large data volume is stored in a storing unit, and the high-compressed video data having a small data volume is transmitted to a surveillance apparatus through a communication line at high speed. Also, in cases where the occurrence of an unusual condition is detected by a detector, an unusual condition detecting signal is transmitted to the surveillance apparatus. In the surveillance apparatus, the high-compressed video data is expanded, and a low-definition scene image of the surveillance area is displayed as a real time image. When the unusual condition detecting signal is received, the signal is displayed, and a watchman can notice the occurrence of the unusual condition. Because the watchman desires to view a scene image at high definition, the low-compressed video data stored in the storing unit is transmitted to the surveillance apparatus in response to a watchman's request, and a high-definition scene image of the surveillance area is displayed as a past-time image. Therefore, the watchman can precisely observe the unusual condition of the surveillance area.

12 Claims, 4 Drawing Sheets

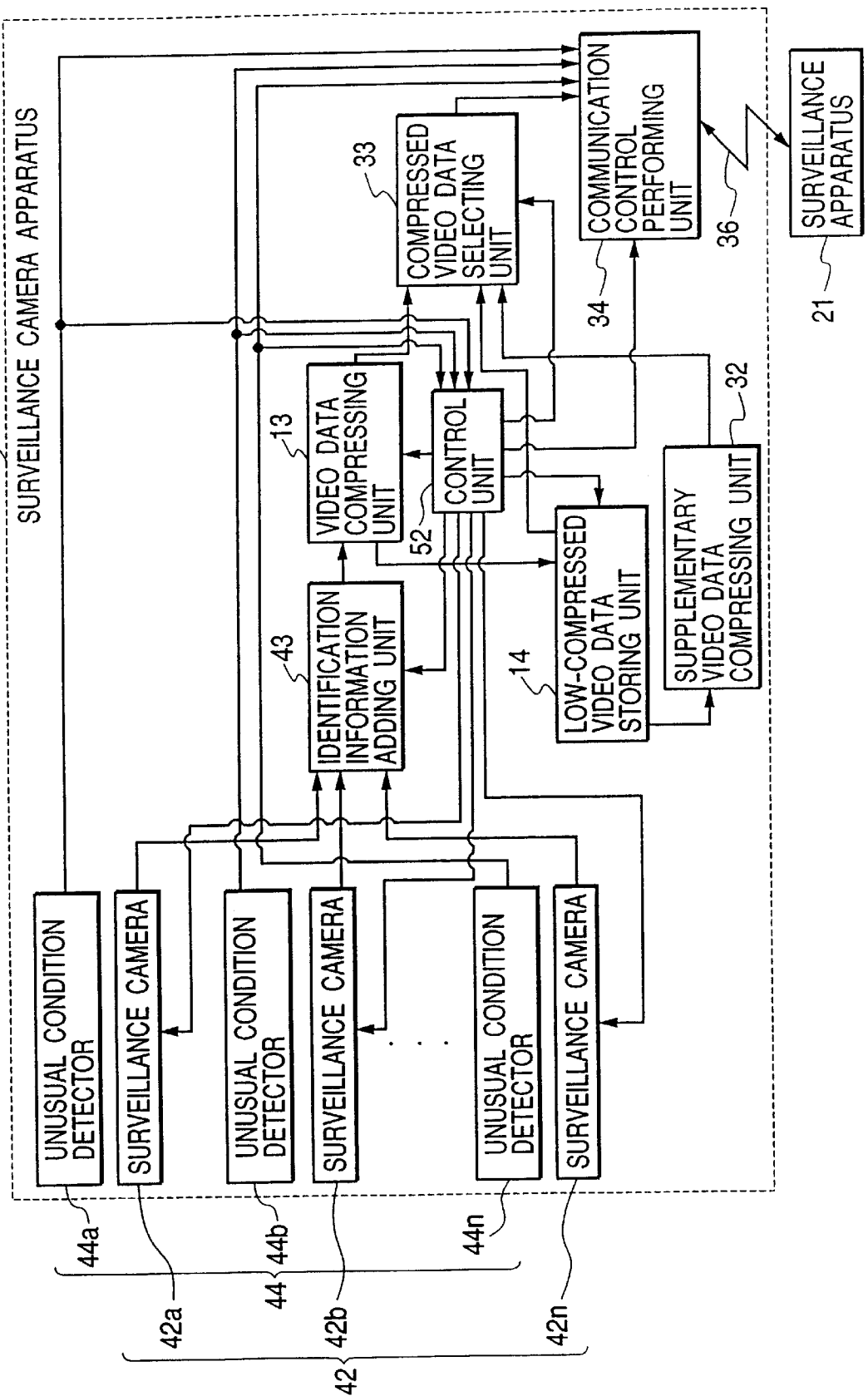

SURVEILLANCE CAMERA APPARATUS, REMOTE SURVEILLANCE APPARATUS AND REMOTE SURVEILLANCE SYSTEM HAVING THE SURVEILLANCE CAMERA APPARATUS AND THE REMOTE SURVEILLANCE APPARATUS

BACKGROUND OF THE INVENTION

1. Field of the Invention

The present invention relates to a surveillance camera apparatus in which video data is obtained by photographing a scene of a surveillance area with a surveillance camera, a remote surveillance apparatus in which the scene of the surveillance area is reproduced from the video data at a remote location, and a remote surveillance system having the surveillance camera apparatus and the remote surveillance apparatus.

2. Description of the Related Art

In a department store or a shopping center, many customers go in and out. In this case, a surveillance camera is arranged in each surveillance area of the store or center, in which a large number of articles of commerce are arranged or a large amount of money is used, to always monitor the surveillance area, and a watchman always watches a monitor, on which a scene of the surveillance area is displayed, in a surveillance room. Therefore, many types of surveillance systems respectively having one surveillance camera and one monitor have been proposed.

2.1. First Previously Proposed Art

For example, a scene of a surveillance area placed in a department store or shopping center is photographed by a surveillance camera, and a monitor for displaying the scene of the surveillance area photographed by the surveillance camera is arranged in a surveillance room placed in the same department store or shopping center. In this case, the surveillance camera is connected to the monitor through a cable.

In this surveillance system, video data indicating a photographed scene image is transmitted from the surveillance camera to the monitor through the cable at a high speed, and the photographed scene image is displayed on the monitor at real time. Therefore, a watchman always watches the photographed scene image displayed on the monitor.

2.2. Problems to be Solved by the Invention

However, in the conventional surveillance system described above, it is required that a watchman always watches the photographed image displayed on the monitor. In this case, because it is required that the watchman carefully watches the photographed image while maintaining the power of his attention, the watching operation is a hard work for the watchman, so that the watchman easily becomes fatigued. Also, because it is required that the watchman always watches the photographed image, the watchman cannot do another work. Also, because a plurality of surveillance cameras are normally arranged in a department store or shopping center, a large number of watchmen are required to reliably watch many photographed scene images transmitted from the surveillance cameras.

2.3. Second Previously Proposed Art

To prevent a hard burden on the watchman and to prevent the requirement of a plurality of watchmen, not only a photographed scene image is displayed on a monitor of a surveillance center at real time, but also video data indicating the photographed scene image is stored in a video data storing unit arranged in the surveillance center. Therefore, when a watchman placed in the surveillance center requires a specific photographed scene image corresponding to a specific time period, specific video data of the specific photographed scene image is read out from the video data storing unit, so that the specific photographed scene image can be reproduced on the monitor of the surveillance center at any time.

Also, in a remote surveillance system, a surveillance camera is arranged in a surveillance area of the department store or the shopping center, and a monitor is placed in a remote surveillance center placed far from the department store or shopping center. In this case, the surveillance camera is connected to the remote surveillance center through a communication line to perform a remote surveillance operation.

2.4. Problems to be solved by the invention

However, in this remote surveillance system, an upper data transfer rate (or a channel capacity) in the communication line is not sufficient to transmit a large volume of video data indicating the photographed scene image, so that it is difficult to transmit a large volume of video data produced by the surveillance camera to the remote surveillance center at high speed. In this case, there is a problem that a photographed scene image of the surveillance area cannot be displayed at real time.

Also, because it is required that the video data storing unit has a large data capacity to store a large data volume of video data indicating a photographed scene image, it is difficult to arrange the remote surveillance center with the video data storing unit in a small-sized area, and it is difficult to provide the remote surveillance system at a low cost.

SUMMARY OF THE INVENTION

A first object of the present invention is to provide, with due consideration to the drawbacks of such a conventional remote surveillance system, a surveillance camera apparatus used for a remote surveillance system, a surveillance apparatus used for the remote surveillance system and the remote surveillance system in which a scene image of a surveillance area photographed by a surveillance camera is easily transmitted from the surveillance camera apparatus to the surveillance apparatus through a communication line having a small channel capacity and is reproduced in the surveillance apparatus at real time to be possible to be viewed by a watchman.

Also, a second object of the present invention is to provide a surveillance camera apparatus used for a remote surveillance system, a surveillance apparatus used for the remote surveillance system and the remote surveillance system in which a burden on a watchman viewing the scene image of the surveillance area is reduced and many watchmen are not required.

The first object is achieved by the provision of a surveillance camera apparatus, comprising:

photographing means for photographing a surveillance area to produce video data indicating a scene of the surveillance area;

video data compressing means for compressing the video data produced by the photographing means at a first compression degree to produce high-compressed video data and compressing the video data at a second compression degree lower than the first compression degree to produce low-compressed video data;

compressed video data storing means for storing the low-compressed video data produced by the video data compressing means;

communication performing means for transmitting the high-compressed video data produced by the video data compressing means to an external apparatus through a communication line to make the external apparatus reproduce a low-definition scene image of the surveillance area at real time or transmitting the low-compressed video data stored in the compressed video data storing means to the external apparatus through the communication line to make the external apparatus reproduce a high-definition past-time scene image of the surveillance area; and control means for controlling the communication performing means to normally transmit the high-compressed video data and to transmit the low-compressed video data in cases where a request for transmitting the low-compressed video data is received.

In the above configuration, video data is produced by photographing a surveillance area with the photographing means, high-compressed video data is obtained by compressing the video data at a first compression degree, low-compressed video data is obtained by compressing the video data at a second compression degree, and the low-compressed video data is stored in the compressed video data storing means. In this case, the high-compressed video data has a small data volume, and the low-compressed video data has a large data volume. Also, a high-definition scene image is reproduced from the low-compressed video data, and a low-definition scene image is reproduced from the high-compressed video data.

Because a communication line connecting the surveillance camera apparatus and the external apparatus has a small channel capacity, though the high-compressed video data having a small data volume can be transmitted through the communication line at a high speed, it is difficult to transmit the low-compressed video data through the communication line at a high speed. Therefore, the high-compressed video data having a small data volume is normally transmitted to the external apparatus through the communication line under the control of the control means, so that a watchman views a low-definition scene image of the surveillance area reproduced from the high-compressed video data in the external apparatus.

In cases where the watchman desires to view a high-definition scene image of the surveillance area, a request for transmitting the low-compressed video data is sent to the control means, so that the low-compressed video data stored in the compressed video data storing means is transmitted to the external apparatus under the control of the control means. Therefore, the watchman can view a high-definition scene image of the surveillance area reproduced from the low-compressed video data in the external apparatus.

Accordingly, even though a channel capacity of the communication line is limited to a small value, because the high-compressed video data having a small data volume is normally transmitted to the external apparatus through the communication line, the watchman can watch a scene image of the surveillance area at real time.

Also, because the low-compressed video data is stored in the compressed video data storing means, in cases where the watchman desires to view a scene image of the surveillance area at high definition, the low-compressed video data stored in the compressed video data storing means is transmitted to the external apparatus through the communication line at a slow speed, and the watchman can reliably view a scene image of the surveillance area reproduced from the low-compressed video data at a high definition as a past-time image.

It is preferred that the surveillance camera apparatus further comprise:

unusual condition detecting means for detecting an unusual condition occurring in the surveillance area and outputting an unusual condition detecting signal to the control means to transmit the low-compressed video data stored in the compressed video data storing means to the external apparatus in place of the high-compressed video data.

In the above configuration, when an unusual condition occurring in the surveillance area is detected by the unusual condition detecting means, an unusual condition detecting signal is output to the control means. Therefore, the low-compressed video data stored in the compressed video data storing means is transmitted to the external apparatus in place of the high-compressed video data under the control of the control means.

Accordingly, even though the watchman normally views a scene image of the surveillance area at a low definition, the watchman can view a past-time scene image of the surveillance area at a high definition when an unusual condition occurs in the surveillance area.

It is also preferred that the surveillance camera apparatus further comprise:

unusual condition detecting means for detecting an unusual condition occurring in the surveillance area and outputting an unusual condition detecting signal to the control means to transmit the low-compressed video data stored in the compressed video data storing means to the external apparatus in place of the high-compressed video data;

a communication line through which the high-compressed video data produced by the video data compressing means and the low-compressed video data stored in the compressed video data storing means are transmitted to the external apparatus, the communication line being normally set to a communication-impossible condition to prohibit the transmission of the high-compressed video data and the low-compressed video data performed by the communication performing means, and the communication-impossible condition of the communication line being changed to a communication-possible condition by the control means to make the communication performing means transmit the high-compressed video data and the low-compressed video data in cases where the unusual condition detecting signal output from the unusual condition detecting means is received by the control means; and supplementary video data compressing means for reading out first low-compressed video data produced by the video data compressing means at an occurrence time of the unusual condition detected by the unusual condition detecting means, second low-compressed video data produced by the video data compressing means just before the production of the first low-compressed video data and third low-compressed video data produced by the video data compressing means just after the production of the first low-compressed video data from the compressed video data storing means under the control of the control means and compressing the first low-compressed video data, the second low-compressed video data and the third low-compressed video data to produce specific compressed video data of which a compression degree is the same as that of the high-compressed video data produced by the video data compressing means, in cases where the unusual condition detecting signal output from the unusual condition detecting means is received by the control means, the specific compressed video data being transmitted to the external apparatus by the communication performing means through the communication line set to the communication-possible condition to make the external apparatus reproduce a low-definition past-time scene image of the surveillance area.

In the above configuration, the communication line is normally set to a communication-impossible condition. When an unusual condition of the surveillance area is detected by the unusual condition detecting means, the unusual condition detecting signal is output to the control means, so that the condition of the communication line is changed to a communication-possible condition by the control means. In this case, it takes a prescribed time to change the condition of the communication line to the communication-possible condition. Therefore, the watchman cannot view a low-definition scene image of the surveillance area corresponding to an occurrence time of the unusual condition at a real time.

Also, when the unusual condition detecting signal is output to the control means, first low-compressed video data produced at an occurrence time of the unusual condition, second low-compressed video data produced just before the production of the first low-compressed video data and third low-compressed video data produced just after the production of the first low-compressed video data are read out from the compressed video data storing means and are compressed to specific compressed video data by the supplementary video data compressing means. In this case, a compression degree of the specific compressed video data is the same as that of the high-compressed video data. Thereafter, the specific compressed video data is transmitted to the external apparatus by the communication performing means through the communication line, and a watchman views a low-definition scene image of the surveillance area as a past-time image.

Accordingly, even though the watchman cannot view a low-definition scene image of the surveillance area reproduced from the high-compressed video data at real time because it takes a prescribed time to change the condition of the communication line to the communication-possible condition, because the specific compressed video data is produced from the first low-compressed video data at the unusual condition occurrence time, the second low-compressed video data produced at the time just before the first low-compressed video data and the third low-compressed video data produced at the time just after the first low-compressed video data and is transmitted to the external apparatus, the watchman can view a low-definition scene image of the surveillance area corresponding to a time period including the unusual condition occurrence time as a past-time image.

Also, because a compression degree of the specific compressed video data is the same as that of the high-compressed video data, even though a channel capacity of the communication line is limited to a small value, the specific compressed video data can be transmitted to the external apparatus through the communication line at high speed, so that the watchman can immediately view a low-definition scene image of the surveillance area corresponding to a time period including the unusual condition occurrence time.

It is also preferred for the second object that the photographing means comprise:

a plurality of surveillance cameras for respectively photographing one surveillance area to produce video data indicating a scene of the surveillance area; and an identification information adding unit for adding identification information to the video data of the surveillance area produced in each surveillance camera to distinguish the video data produced in each surveillance camera from the video data produced in the other surveillance cameras.

In the above configuration, even though a plurality of surveillance cameras are arranged to photograph a plurality of surveillance areas, because identification information is added to the video data produced by each surveillance camera, a watchman can specify the surveillance camera corresponding to a scene image displayed in the external apparatus.

The first and second objects are also achieved by the provision of a surveillance apparatus, comprising:

communication performing means for receiving compressed video data transmitted from a surveillance camera apparatus through a communication line;

compressed video data expanding means for expanding the compressed video data received by the communication performing means to produce video data indicating a scene image of a surveillance area;

displaying means for displaying a scene image of a surveillance area according to the video data produced by the compressed video data expanding means as a real time image;

compressed video data storing means for storing the compressed video data received by the communication performing means as past compressed video data;

instruction receiving means for receiving an instruction for displaying a past-time scene image; and control means for controlling the compressed video data expanding means, the displaying means and the compressed video data storing means according to the instruction received by the instruction receiving means to stop the expanding of the compressed video data, read out the past compressed video data from the compressed video data storing means, expand the past compressed video data by the compressed video data expanding means to produce past video data and display a past-time scene image of the surveillance area according to the past video data by the displaying means.

In the above configuration, in a normal operation, the compressed video data received by the communication performing means is expanded by the compressed video data expanding means to produce video data, and a scene image of a surveillance area is displayed as a real time image according to the video data by the displaying means.

However, in cases where a watchman desires to view a past-time image of the surveillance area because the watchman misses viewing the scene image of the surveillance area at real time, the watchman inputs an instruction for displaying a past-time scene image to the instruction receiving means. In this case, the expanding of the compressed video data is stopped under the control of the control means, the past compressed video data is read out from the compressed video data storing means under the control of the control means, the past compressed video data is expanded by the compressed video data expanding means under the control of the control means to produce past video data, and a past-time scene image of the surveillance area is displayed according to the past video data by the displaying means under the control of the control means.

Accordingly, a past-time scene image of the surveillance area can be displayed in place of the real time scene image, so that a burden on the watchman can be reduced because it is not required that the watchman always views the scene image displayed at real time.

The first object is also achieved by the provision of a remote surveillance system, comprising:

a surveillance camera apparatus for producing compressed video data indicating a scene of a surveillance area;

a surveillance apparatus for displaying the scene image of the surveillance area according to the compressed video data produced by the surveillance camera apparatus; and a communication line through which the compressed video data produced by the surveillance camera apparatus is transmitted to the surveillance apparatus, wherein the surveillance camera apparatus comprises:

photographing means for photographing the surveillance area to produce the video data;

video data compressing means for compressing the video data produced by the photographing means at a first compression degree to produce high-compressed video data and compressing the video data at a second compression degree lower than the first compression degree to produce low-compressed video data;

compressed video data storing means for storing the low-compressed video data produced by the video data compressing means; and communication performing means for transmitting the high-compressed video data produced by the video data compressing means to the surveillance apparatus through the communication line or transmitting the low-compressed video data stored in the compressed video data storing means to the surveillance apparatus through the communication line, and the surveillance apparatus comprises:

communication performing means for receiving the high-compressed video data or the low-compressed video data transmitted from the surveillance camera apparatus through the communication line;

compressed video data expanding means for expanding the high-compressed video data or the low-compressed video data received by the communication performing means to produce expanded video data;

displaying means for displaying a low-definition scene image of the surveillance area according to the expanded video data produced from the high-compressed video data by the compressed video data expanding means as a real time image or displaying a high-definition scene image of the surveillance area according to the expanded video data produced from the low-compressed video data by the compressed video data expanding means as a past-time image;

instruction receiving means for receiving an instruction for displaying a past-time scene image; and control means for controlling the surveillance camera apparatus to normally output the high-compressed video data compressed by the video data compressing means and to output the low-compressed video data stored in the compressed video data storing means in cases where the instruction for displaying a high-definition scene image is received by the instruction receiving means.

In the above configuration, in the surveillance camera apparatus, video data is produced by photographing a surveillance area with the photographing means, high-compressed video data is obtained by compressing the video data at a first compression degree, low-compressed video data is obtained by compressing the video data at a second compression degree, and the low-compressed video data is stored in the compressed video data storing means. The high-compressed video data is normally transmitted to the surveillance apparatus through the communication line. In the surveillance apparatus, the high-compressed video data is expanded by the compressed video data expanding means, so that a low-definition scene image of the surveillance area is displayed by the displaying means.

Accordingly, even though a channel capacity of the communication line is limited to a small value, because the high-compressed video data has a small data volume, the high-compressed video data can be transmitted to the surveillance apparatus through the communication line at high speed, so that a watchman can view a scene image of the surveillance area at real time.

When the watchman desires to view a scene image of the surveillance area at high definition, the watchman inputs an instruction for displaying a high-definition scene image to the instruction receiving means. In this case, the surveillance camera apparatus is controlled by the control means to output the low-compressed video data to the surveillance apparatus in place of the high-compressed video data, the low-compressed video data is expanded by the compressed video data expanding means, so that a high-definition scene image of the surveillance area is displayed by the displaying means.

Accordingly, the watchman can view a high-definition scene image of the surveillance area as a past-time image when the watchman desires to view a scene image of the surveillance area at high definition.

It is preferred that the surveillance camera apparatus further comprise:

unusual condition detecting means for detecting an unusual condition occurring in the surveillance area; and control means for controlling the communication performing means to output unusual condition detecting information to the surveillance apparatus in cases where the unusual condition is detected by the unusual condition detecting means, the unusual condition detecting information output by the communication performing means being displayed by the displaying means.

In the above configuration, when the occurrence of an unusual condition is detected by the unusual condition detecting means, unusual condition detecting information is output to the surveillance apparatus under the control of the control means of the surveillance camera apparatus. Therefore, the watchman can notice the occurrence of the unusual condition by viewing the unusual condition detecting information displayed by the displaying means. In this case, because the watchman desires to view a scene image of the surveillance area at high definition, the watchman inputs the instruction for displaying a high-definition scene image to the instruction receiving means, and the watchman views a high-definition scene image of the surveillance area displayed by the displaying means at a past-time image.

Accordingly, the watchman can view the scene image of the surveillance area at high definition when an unusual condition occurs in the surveillance area.

It is preferred for the second object that the surveillance apparatus further comprise:

compressed video data storing means for storing the high-compressed video data received by the communication performing means as past compressed video data, the past compressed video data being expanded to expanded past compressed video data by the compressed video data expanding means in place of the high-compressed video data received by the communication performing means under the control of the control means in cases where an instruction for displaying a past-time scene image is received by the instruction receiving means, and a scene image of the surveillance area reproduced from the expanded past compressed video data being displayed by the displaying means as a past-time image.

In the above configuration, even though the watchman misses viewing a scene image at real time, the watchman can view the scene image at a past-time image. Also, because the high-compressed video data having a small data volume is stored in the compressed video data storing means, a large data capacity is not required for the compressed video data storing means. Therefore, the surveillance apparatus can be made small, and the remote surveillance system can be made at a low cost.

It is also preferred for the second object that the photographing means comprise:

a plurality of surveillance cameras for respectively photographing one surveillance area to produce video data indicating a scene of the surveillance area; and an identification information adding unit for adding identification information to the video data of the surveillance area produced in each surveillance camera to distinguish the video data produced in each surveillance camera from the video data produced in the other surveillance cameras, the high-compressed video data with the identification information corresponding to each surveillance camera being transmitted from the surveillance camera apparatus to the surveillance apparatus to display a low-definition scene image as a real-time image by the displaying means for each surveillance camera.

In the above configuration, even though a plurality of surveillance cameras are arranged to photograph a plurality of surveillance areas, because identification information is added to the video data produced by each surveillance camera, the high-compressed video data with the identification information corresponding to each surveillance camera being transmitted from the surveillance camera apparatus to the surveillance apparatus. Therefore, a watchman can specify the surveillance camera corresponding to a scene image.

BRIEF DESCRIPTION OF THE DRAWINGS

The objects, features and advantages of the present invention will be apparent from the following description taken in conjunction with the accompanying drawings, in which:

FIG. 4 is a block diagram of a remote surveillance system comprising a surveillance camera apparatus, a surveillance apparatus and a communication line according to a modification of the third embodiment.

DETAILED DESCRIPTION OF THE EMBODIMENTS

Preferred embodiments of a surveillance camera apparatus, a surveillance apparatus and a remote surveillance system having the surveillance camera apparatus and the surveillance apparatus according to the present invention are described with reference to the drawings.

First Embodiment

Figure 1:
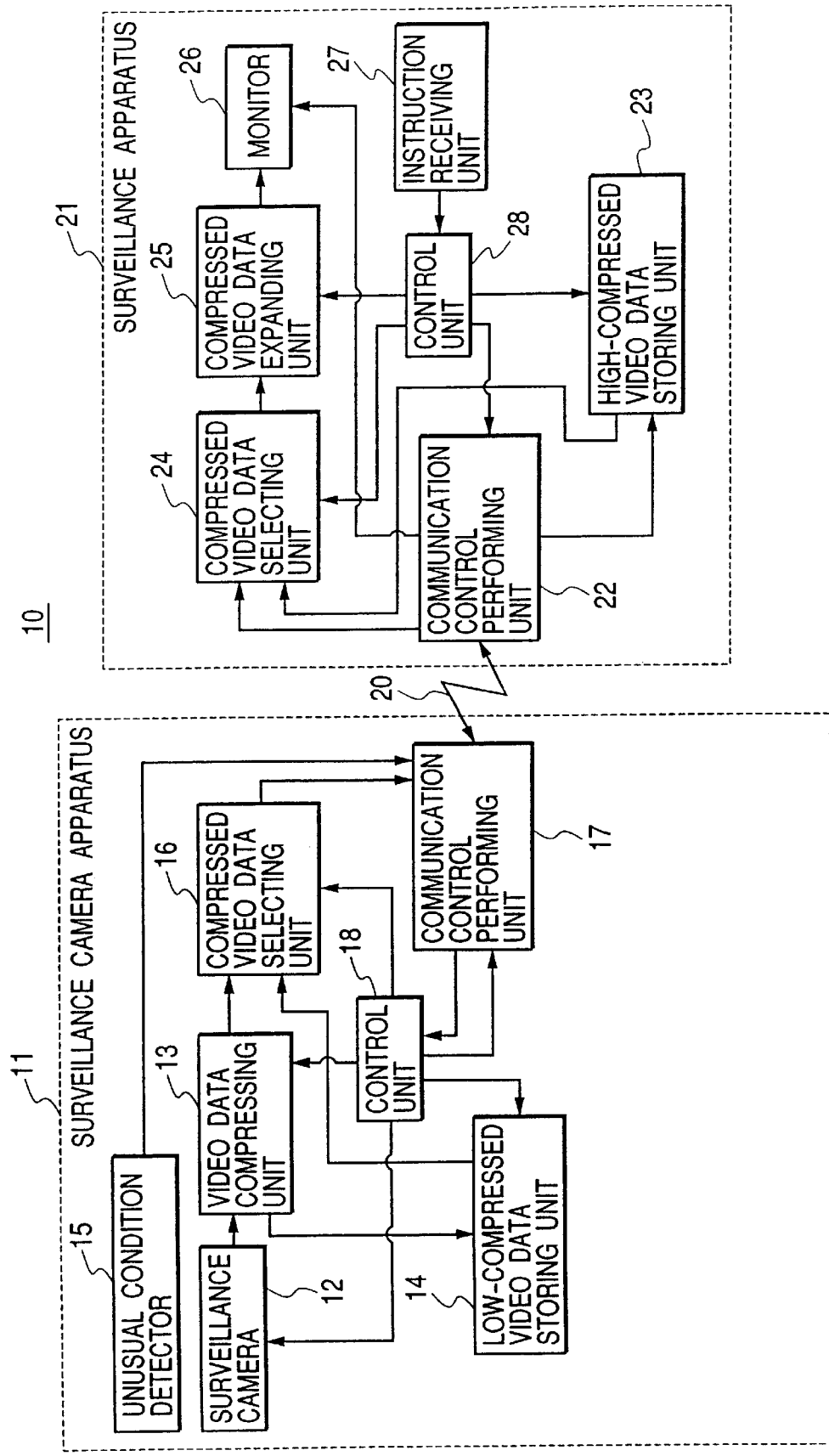
FIG. 1 is a block diagram of a remote surveillance system comprising a surveillance camera apparatus, a surveillance apparatus and a communication line according to a first embodiment of the present invention.

FIG. 1 is a block diagram of a remote surveillance system according to a first embodiment of the present invention.

As shown in FIG. 1, a remote surveillance system 10 comprises a surveillance camera apparatus 11, arranged in a surveillance zone such as a department store or a shopping center, for photographing a predetermined surveillance area of the surveillance zone, producing video data indicating a scene of the surveillance area and detecting an unusual condition occurring in the surveillance area;

a surveillance apparatus 21, arranged in a surveillance center far from the surveillance zone, for processing the video data transmitted from the surveillance camera apparatus 11, normally displaying a low-definition scene image of the surveillance area and displaying a high-definition scene image of the surveillance area when an unusual condition occurs in the surveillance area; and a communication line 20, connecting the surveillance camera apparatus 11 and the surveillance apparatus 21, for transmitting the video data from the surveillance camera apparatus 11 to the surveillance apparatus 21.

In this embodiment, an integrated service digital network (ISDN) private line is used for the communication line 20, and the communication line 20 is set to an always-communication-possible condition (that is, an off-hook condition) when the remote surveillance system 11 is operated.

The surveillance camera apparatus 11 comprises:

a surveillance camera 12 for always photographing the surveillance area of the surveillance zone to produce video data of the surveillance area;

a video data compressing unit 13 for compressing the video data produced in the surveillance camera 12 at a first compression degree to produced high-compressed video data and compressing the video data at a second compression degree lower than the first compression degree to produced low-compressed video data having a definition higher than that of the high-compressed video data;

a low-compressed video data storing unit 14 for always storing the low-compressed video data produced in the video data compressing unit 13;

an unusual condition detector 15 for detecting an unusual condition occurring in the surveillance area and outputting an unusual condition detecting signal indicating the occurrence of the unusual condition;

a compressed video data selecting unit 16 for selecting the high-compressed video data produced in the video data compressing unit 13 or the low-compressed video data stored in the low-compressed video data storing unit 14;

a communication control performing unit 17 for performing a communication control to output the high-compressed video data or the low-compressed video data selected in the compressed video data selecting unit 16 to the communication line 20 and to output the unusual condition detecting signal transmitted from the unusual condition detector 15 to the communication line 20; and a control unit 18 for adding unusual condition occurrence information to specific low-compressed video data currently produced in the video data compressing unit 13 at a current time according to the unusual condition detecting signal transmitted from the communication control performing unit 17 to record the occurrence of an unusual condition at the current time in the specific low-compressed video data currently produced and controlling operations of the surveillance camera 12, the video data compressing unit 13, the low-compressed video data storing unit 14, the communication control performing unit 17 and the compressed video data selecting unit 16 to normally transmit the high-compressed video data to the surveillance apparatus 21 through the communication line 20 and to transmit the specific low-compressed video data stored in the low-compressed video data storing unit 14 to the surveillance apparatus 21 through the communication line 20 when a high-definition video data request is received from the surveillance apparatus 21 through the communication line 20.

A scene of the surveillance area is photographed by using the surveillance camera 12 while moving the surveillance camera 12 in a panning operation (that is, a rotational movement on a horizontal plane formed on a supporting stand of the surveillance camera 12) and a tilting operation (that is, an alternating motion perpendicular to the horizontal plane of the supporting stand), so that video data indicating a scene of the surveillance area is obtained.

The video data compressing unit 13 has a data compressing algorithm for performing a compression method at two compression modes. Therefore, high-compressed video data is obtained from the photographing of the surveillance camera 12 by compressing the video data at a first compression degree, and low-compressed video data is obtained from the photographing of the surveillance camera 12 by compressing the video data at a second compression degree lower than the first compression degree.

As a compressed image obtained from the high-compressed video data or the low-compressed video data, an image according to Joint Photographic Experts Group (JPEG), a thinned-out image in which only one frame exists for each second, a thumbnail image in which an image size is made small by thinning out pixels from the image, an image according to H261 coding method of International Telecommunications union Telecommunication Standards (ITU-TS) or a motion picture according to Moving Picture Experts Group (MPEG) is reproduced in the surveillance apparatus 21.

In this case, because the second compression degree is lower than the first compression degree, a data volume of the low-compressed video data is higher than that of the high-compressed video data, and an image definition of the low-compressed video data is higher than that of the high-compressed video data. The low-compressed video data is called high-definition compressed video data, and the high-compressed video data is called low-definition compressed video data.

As the low-compressed video data storing unit 14, a large memory capacity of storing means such as a hard disc drive (HDD), a magnet-optical disc or a digital video disc random access memory (DVD-RAM) is used.

A data transfer rate in the communication line 20 is limited. For example, an upper limit of the data transfer rate ranges from 64 Kbits per second (Kbps) to 128 Kbps. Because a data volume of the high-compressed video data is low, the high-compressed video data can be transmitted at a high speed to the surveillance apparatus 21 through the communication line 20. In the data transmission using the ISDN private line, the compressed video data is transmitted at a 2B channel of the communication line 20.

As the unusual condition detector 15, an environmental condition sensor such as a light sensor, a hot-air sensor or a sound sensor is, for example, used. Therefore, an unusual condition such as a high level of light, a high hot air or a large sound is detected in the surveillance area by the unusual condition detector 15, the unusual condition detecting signal is transmitted to the communication control performing unit 17. Also, it is applicable that the unusual condition detector 15 be made of a detecting unit for detecting a motion of an image reproduced from the compressed video data, a detecting unit for detecting a scene change of an image reproduced from the compressed video data or an image recognizing unit for recognizing a feature of an image. In this case, the unusual condition detector 15 is arranged in the video data compressing unit 13. For example, a moved image reproduced from the compressed video data is detected as an unusual condition by the motion image detecting unit, a scene change caused by a specific condition such as a fire condition is detected as an unusual condition by the scene change detecting unit, and a feature (a shape or a color) of an image reproduced from the compressed video data is recognized as an unusual condition by the image recognizing unit.

In the signal transmission using the ISDN private line, the unusual condition detecting signal is transmitted at a D channel of the communication line 20.

The control unit 18 is made of an arithmetic processing unit such as a central processing unit (CPU).

The surveillance apparatus 21 comprises:

a communication control performing unit 22 for performing a communication control to receive the high-compressed video data or the low-compressed video data from the surveillance camera apparatus 11 through the communication line 20 and to receive the unusual condition detecting signal from the surveillance camera apparatus 11 through the communication line 20;

a high-compressed video data storing unit 23 for storing the high-compressed video data transmitted from the surveillance camera apparatus 11 through the communication control performing unit 22 as past compressed video data;

a compressed video data selecting unit 24 for selecting the high-compressed video data or the low-compressed video data transmitted from the surveillance camera apparatus 11 through the communication control performing unit 22 or the past compressed video data stored in the high-compressed video data storing unit 23;

a compressed video data expanding unit 25 for expanding the high-compressed video data, the low-compressed video data or the past compressed video data selected in the compressed video data selecting unit 24;

a monitor 26 for displaying a surveillance zone indicated by the video data expanded in the compressed video data expanding unit 25 for a watchman and displaying the unusual condition detecting signal transmitted to the communication control performing unit 22;

an instruction receiving unit 27 for receiving a past compressed video data request from the watchman and receiving a high-definition video data request from the watchman when the watchman notices that the unusual condition detecting signal is displayed on the monitor 26; and a control unit 28 for controlling operations of the communication control performing unit 22, the high-compressed video data storing unit 23, the compressed video data selecting unit 24, the compressed video data expanding unit 25 to normally display a low-definition current scene of the surveillance area on the monitor 26 according to the high-compressed video data currently received in the communication control performing unit 22, to display a low-definition past-time scene of the surveillance area on the monitor 26 according to the past compressed video data when the past compressed video data request is received in the instruction receiving unit 27 or to display a high-definition scene of the surveillance area on the monitor 26 according to the low-compressed video data received in the communication control performing unit 22 when the high-definition video data request is received in the instruction receiving unit 27.

In the compressed video data expanding unit 25, a plurality of data expanding algorithms are prepared, so that a data expanding operation for compressed video data is performed in the expanding unit 25 according to one data expanding algorithm corresponding to the data compressing method performed in the surveillance camera apparatus 11.

The high-compressed video data storing unit 23 is used as a storing unit for browser, and a large memory capacity of storing means such as a hard disc drive (HDD), a magnet-optical disc or a digital video disc random access memory (DVD-RAM) is used as the high-compressed video data storing unit 23.

As the monitor 26, a display unit such as a cathode-ray tube (CRT), a liquid crystal display or the like is used.

The control unit 28 is made of an arithmetic processing unit such as a central processing unit (CPU).

The instruction receiving unit 27 is, for example, made of a keyboard and/or a mouse.

In the above configuration of the surveillance camera apparatus 11 and the surveillance apparatus 21, operations performed in the remote surveillance system 10 are described.

A normal operation is initially described. In the surveillance camera apparatus 11, a scene of a surveillance area is always photographed by the surveillance camera 15 to obtain video data indicating the scene of the surveillance area, and an environmental condition of the surveillance area is always detected by the unusual condition detector 15 to check whether or not an unusual condition occurs in the surveillance area. In the video data compressing unit 13, the video data is compressed to high-compressed video data at a first compression degree. The high-compressed video data has a small data volume, and a compressed image reproduced from the high-compressed video data has a low definition. Thereafter, the high-compressed video data is selected by the compressed video data selecting unit 16 and is transmitted to the surveillance apparatus 21 as representative information through the communication control performing unit 17 and the communication line 20. Also, the video data is compressed to low-compressed video data at a second compression degree in the video data compressing unit 13, and the low-compressed video data is stored in the low-compressed video data storing unit 14. The low-compressed video data has a high data volume, and a compressed image reproduced from the low-compressed video data has a high definition. Therefore, because the high-compressed video data having a data volume smaller than that of the low-compressed video data is transmitted through the communication line 20, the high-compressed video data can be transmitted to the surveillance apparatus 21 at a high speed.

In the surveillance apparatus 21, when the high-compressed video data transmitted from the surveillance camera apparatus 11 through the communication line 20 is received in the communication control performing unit 22, the high-compressed video data is selected by the compressed video data selecting unit 24. Thereafter, the high-compressed video data is expanded in the compressed video data expanding unit 25, and a low-definition scene image of the surveillance area reproduced from the high-compressed video data is displayed on the monitor 26 as a real-time image.

Accordingly, because the high-compressed video data transmitted from the surveillance camera apparatus 11 to the surveillance apparatus 21 through the communication line 20 has a data volume smaller than that of the low-compressed video data, the high-compressed video data can be transmitted at a high speed, and the watchman can view a scene image of the surveillance area at real time.

Thereafter, in cases where the watchman desires to again view a scene image of the surveillance area at high-definition, the watchman inputs a high-definition scene image request to the instruction receiving unit 27. The high-definition scene image request is transmitted from the control unit 28 of the surveillance apparatus 21 to the control unit 18 of the surveillance camera apparatus 11 through the communication control performing units 17 and 22 and the communication line 20. Thereafter, the compressed video data selecting unit 16 is controlled by the control unit 18 to select compressed video data stored in the low-compressed video data storing unit 14, the low-compressed video data of the low-compressed video data storing unit 14 is transmitted to the surveillance apparatus 21 through the selecting unit 16, the communication control performing unit 17 and the communication line 20. In this case, a compressing operation for video data obtained in the surveillance camera 12 is continued in the video data compressing unit 13 during the transmission of the low-compressed video data, and a storing operation of low-compressed video data produced in the video data compressing unit 13 to the low-compressed video data storing unit 14 is continued.

In the surveillance apparatus 21, when the low-compressed video data is received in the communication control performing unit 22, the low-compressed video data is expanded in the video data expanding unit 25, and a high-definition scene image of the surveillance area reproduced from the low-compressed video data is displayed on the monitor 26 as a past high-definition image.

Accordingly, the watchman can reliably view a scene image of the surveillance area at high-definition.

Next, a missed scene re-displaying operation is described.

The high-compressed video data received in the surveillance camera apparatus 11 is also stored in the high-compressed video data storing unit 23 as past compressed video data. In cases where the watchman misses watching a scene of the surveillance area in a missing time period, the watchman inputs a missed scene request to the instruction receiving unit 27. Therefore, the compressed video data selecting unit 24 is controlled by the control unit 28 to select past compressed video data of the high-compressed video data storing unit 23, and the high-compressed video data storing unit 23 is searched for specific past compressed video data corresponding to the missing time period under the control of the control unit 23. In this searching operation, a "play" operation, a "pause" operation, a "fast forward (FF)" operation, a "rewinding (REW)" operation, a "jogging (JOG)" operation and/or a "shuttle" operation are performed under the control of the control unit 28 to find out the specific past compressed video data from the high-compressed video data storing unit 23 as if the high-compressed video data storing unit 23 made of an image storing unit for browser is a tape recording unit, or a data base retrieving operation is performed for the low-compressed video data storing unit 14 under the control of the control unit 28 to find out the specific past compressed video data from the high-compressed video data storing unit 23. Thereafter, the specific past compressed video data found out from the high-compressed video data storing unit 23 is expanded in the video data expanding unit 25, and a low-definition scene image of the surveillance area reproduced from the specific past compressed video data is displayed on the monitor 26 as a missed past-time image.

Accordingly, even though the watchman misses watching a scene of the surveillance area, because the high-compressed video data is also stored in the high-compressed video data storing unit 23 as past compressed video data, the watchman can view a low-definition scene image of the surveillance area later. Also, because the high-compressed video data having a small data volume is stored in the high-compressed video data storing unit 23, a data capacity required of the high-compressed video data storing unit 23 can be made small.

Next, an unusual condition occurrence operation is described.

In cases where an unusual condition occurring in the surveillance area is detected by the unusual condition detector 15, an unusual condition detecting signal indicating the occurrence of the unusual condition is output to the communication control performing unit 17, and the unusual condition detecting signal is transmitted to the control unit 18. When the unusual condition detecting signal is received in the control unit 18 at a current time, unusual condition occurrence information is added to specific low-compressed video data currently produced in the video data compressing unit 13 at the current time to record the occurrence of an unusual condition at the current time in the specific low-compressed video data currently produced, and the specific low-compressed video data with the unusual condition occurrence information is stored in the low-compressed video data storing unit 14.

Also, the unusual condition detecting signal is transmitted from the communication control performing unit 17 to the surveillance apparatus 21 through the communication line 20, and the unusual condition detecting signal is immediately displayed with the low-definition scene image of the surveillance area on the monitor 26. When the watchman watching the monitor 26 notices the unusual condition detecting signal displayed on the monitor 26, the watchman inputs a high-definition scene image request to the instruction receiving unit 27. The high-definition scene image request is transmitted from the control unit 28 of the surveillance apparatus 21 to the control unit 18 of the surveillance camera apparatus 11 through the communication control performing units 17 and 22 and the communication line 20.

Thereafter, the low-compressed video data storing unit 14 is searched for the specific low-compressed video data corresponding to the unusual condition under the control of the control unit 18, and the compressed video data selecting unit 16 is controlled by the control unit 18 to select compressed video data of the low-compressed video data storing unit 14. Because the unusual condition occurrence information is added to the specific low-compressed video data, the specific low-compressed video data can be easily found out. The specific low-compressed video data found out is transmitted to the surveillance apparatus 21 through the selecting unit 16, the communication control performing unit 17 and the communication line 20. In this case, a compressing operation for video data obtained in the surveillance camera 12 is continued in the video data compressing unit 13 during the transmission of the specific low-compressed video data, and a storing operation of low-compressed video data produced in the video data compressing unit 13 to the low-compressed video data storing unit 14 is continued.

In the surveillance apparatus 21, when the specific low-compressed video data is received in the communication control performing unit 22, the specific low-compressed video data is expanded in the video data expanding unit 25, and a high-definition scene image of the surveillance area reproduced from the specific low-compressed video data is displayed on the monitor 26 as a past high-definition image corresponding to the unusual condition.

Accordingly, even though the watchman normally views a scene image of the surveillance area at a low definition, because the unusual condition detecting signal is immediately displayed on the monitor 26 when an unusual condition occurs in the surveillance area, the watchman can reliably notice the occurrence of the unusual condition.

Also, because unusual condition occurrence information is added to specific low-compressed video data corresponding to the unusual condition, when the watchman inputs a high-definition scene image request, the specific low-compressed video data can be easily found out from the low-compressed video data storing unit 14, and a scene image of the surveillance area reproduced from the specific low-compressed video data can be displayed on the monitor 26 at a high definition. Therefore, the watchman can observe the unusual condition occurred in the surveillance area in detail.

In this embodiment, the specific low-compressed video data corresponding to the unusual condition is transmitted to the surveillance apparatus 21 in cases where the watchman inputs a high-definition scene image request. However, it is applicable that low-compressed video data currently produced be automatically transmitted to the surveillance apparatus 21 with high-compressed video data currently produced when the occurrence of an unusual condition is detected by the unusual condition detector 15. In this case, the watchman can immediately observe the unusual condition of the surveillance area by manually or automatically changing the display of a low-definition scene image produced from the high-compressed video data to the display of a high-definition scene image produced from the low-compressed video data in the monitor 26.

Second Embodiment

In this embodiment, any communication between a surveillance camera apparatus and a surveillance apparatus is not normally performed, and a communication between a surveillance camera apparatus and a surveillance apparatus is performed only when an unusual condition is occurred in a surveillance area.

Figure 2:
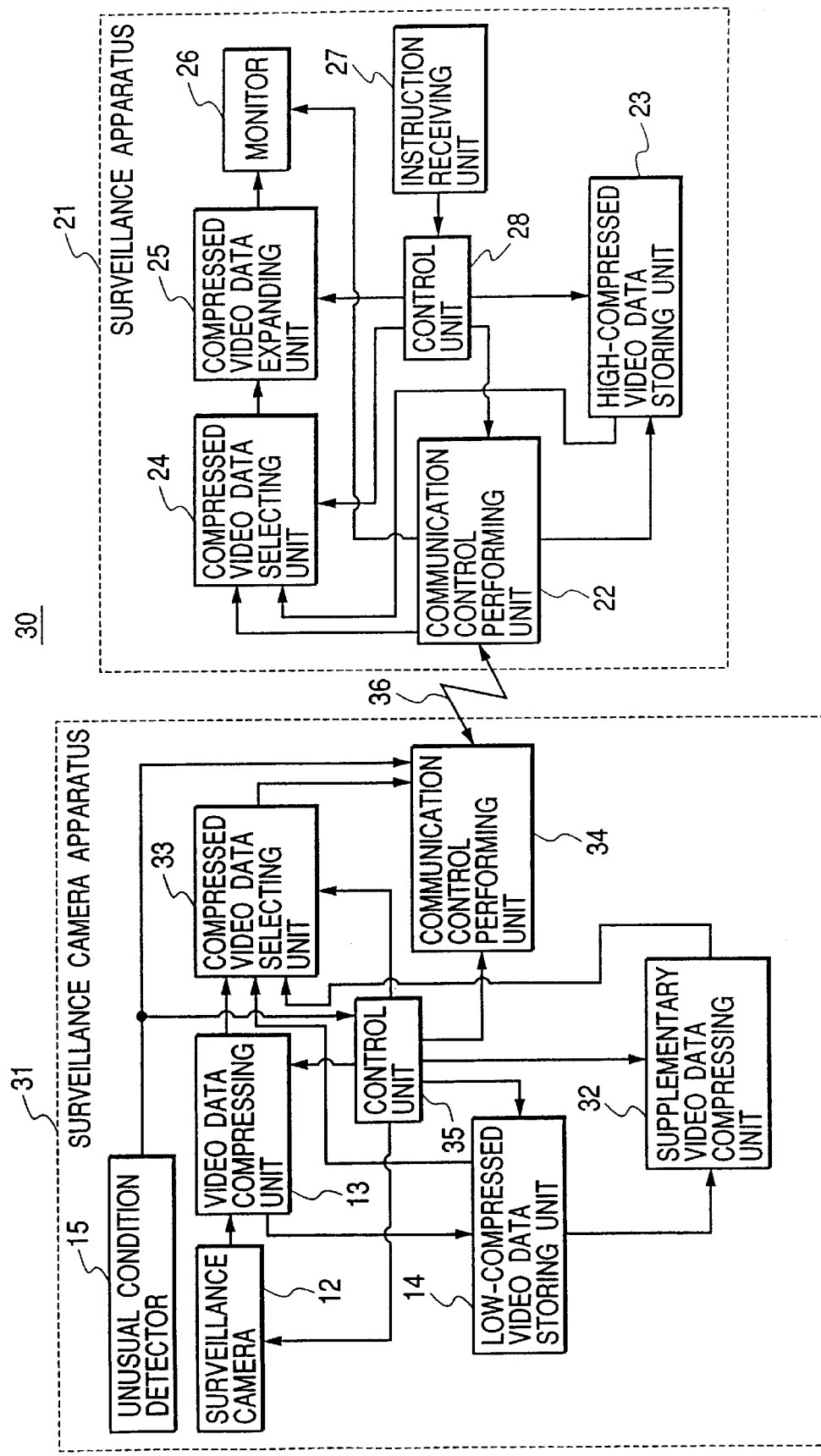
FIG. 2 is a block diagram of a remote surveillance system comprising a surveillance camera apparatus, a surveillance apparatus and a communication line according to a second embodiment of the present invention.

FIG. 2 is a block diagram of a remote surveillance system according to a second embodiment of the present invention.

As shown in FIG. 2, a remote surveillance system 30 comprises
- a surveillance camera apparatus 31, arranged in a surveillance zone such as a department store or a shopping center, for photographing a predetermined surveillance area of the surveillance zone, producing video data indicating a scene of the surveillance area and detecting an unusual condition occurring in the surveillance area;
- the surveillance apparatus 21; and
- a communication line 36, connecting the surveillance camera apparatus 31 and the surveillance apparatus 21, for normally performing no communication between the surveillance camera apparatus 31 and the surveillance apparatus 21 and transmitting the video data produced in the surveillance camera apparatus 31 to the surveillance apparatus 21 when an unusual condition occurs in the surveillance area.

In this embodiment, an integrated service digital network (ISDN) private line is used for the communication line 36, the communication line 36 is normally set to a communication-impossible condition (that is, an on-hook condition), and the communication-impossible condition of the communication line 36 is changed to a communication-possible condition (that is, an off-hook condition) when an unusual condition occurs in the surveillance area.

The surveillance camera apparatus 31 comprises:
- the surveillance camera 12; the video data compressing unit 13; the low-compressed video data storing unit 14; the unusual condition detector 15;
- a supplementary video data compressing unit 32 for reading out first low-compressed video data produced when an unusual condition is detected by the unusual condition detector 15, second low-compressed video data produced just before the production of the first low-compressed video data and third low-compressed video data produced just after the production of the first low-compressed video data from the high-compressed video data storing unit 14 and compressing the first low-compressed video data, the second low-compressed video data and the third low-compressed video data to produce specific high-compressed video data of which a compression degree is the same as that of the high-compressed video data produced in the video data compressing unit 13;
- a compressed video data selecting unit 33 for selecting the high-compressed video data produced in the video data compressing unit 13, the specific high-compressed video data produced in the supplementary video data compressing unit 32 or the low-compressed video data stored in the low-compressed video data storing unit 14;
- a communication control performing unit 34 for performing a communication control to output the high-compressed video data, the specific high-compressed video data or the low-compressed video data selected in the compressed video data selecting unit 33 to the communication line 36 only when the unusual condition is detected by the unusual condition detector 15 and to output the unusual condition detecting signal obtained in the unusual condition detector 15 to the communication line 36; and
- a control unit 35 for adding unusual condition occurrence information to specific low-compressed video data currently produced in the video data compressing unit 13 at a current time according to the unusual condition detecting signal transmitted from the unusual condition detector 15 to record the occurrence of an unusual condition at the current time in the specific low-compressed video data currently produced, controlling the communication control performing unit 34 to transmit a call to the surveillance apparatus 21 for the purpose of performing a communication between the surveillance camera apparatus 31 and the surveillance apparatus 21 through the communication line 36 and controlling operations of the surveillance camera 12, the video data compressing unit 13, the low-compressed video data storing unit 14, the supplementary video data compressing unit 32 and the compressed video data selecting unit 33 to transmit the specific high-compressed video data produced in the supplementary video data compressing unit 32 to the surveillance apparatus 21 through the communication line 36 according to the unusual condition detecting signal obtained in the unusual condition detector 15 and to transmit the specific low-compressed video data stored in the low-compressed video data storing unit 14 to the surveillance apparatus 21 through the communication line 36 when a high-definition scene image request is received from the surveillance apparatus 21 through the communication line 36.

In the above configuration of the surveillance camera apparatus 31 and the surveillance apparatus 21, operations performed in the remote surveillance system 30 are described.

The communication line 36 is set to a communication-impossible condition. In the surveillance camera apparatus 31, low-compressed video data is stored in the low-compressed video data storing unit 14 in the same manner as in the first embodiment. When an unusual condition occurring in the surveillance area is detected by the unusual condition detector 15, an unusual condition detecting signal is transmitted to the communication control performing unit 34 and the control unit 35. The unusual condition detecting signal transmitted to the communication control performing unit 34 is sent to the surveillance apparatus 21 through a D channel of the communication line 36 under the control of the control unit 35, and the unusual condition detecting signal is displayed on the monitor 26 in the same manner as in the first embodiment. Also, a call is transmitted from the control unit 35 to the control unit 28 of the surveillance apparatus 21 according to the unusual condition detecting signal transmitted to the control unit 35, and a communication between the surveillance camera apparatus 31 and the surveillance apparatus 21 through the communication line 36 is established. That is, the communication-impossible condition of the communication line 36 is changed to a communication-possible condition. Thereafter, a video data transmission operation is started. In this case, it takes a communication start time period (for example, 15 seconds in case of the ISDN line) until the video data transmission operation is started after the occurrence of the unusual condition.

Thereafter, first low-compressed video data produced at a time of the occurrence of the unusual condition, second low-compressed video data produced just before the production of the first low-compressed video data and third low-compressed video data produced just after the production of the first low-compressed video data are read out from the high-compressed video data storing unit 14 to the supplementary video data compressing unit 32, and the first low-compressed video data, the second low-compressed video data and the third low-compressed video data are compressed to produce specific high-compressed video data of which a compression degree is the same as that of the high-compressed video data produced in the video data compressing unit 13.

Thereafter, the specific high-compressed video data indicating a scene of the surveillance area in a specific time period including the unusual condition occurring time is transmitted to the surveillance apparatus 21 through a 2B channel of the communication line 36. In this case, the selecting unit 33 is controlled by the control unit 35 to select the specific high-compressed video data transmitted from the supplementary video data compressing unit 32. The specific high-compressed video data transmitted to the surveillance apparatus 21 is expanded in the video data expanding unit 25, and a low-definition scene image of the surveillance area produced from the specific high-compressed video data is displayed on the monitor 26 as a past-time image. Also, the specific high-compressed video data transmitted to the surveillance apparatus 21 is stored in the high-compressed video data storing unit 23.

After the specific time period is passed, high-compressed video data produced in the video data compressing unit 13 is transmitted to the surveillance apparatus 21 through the communication line 36 and is expanded in the expanding unit 25, a low-definition scene image of the surveillance area is displayed on the monitor 26 as a real-time image, and the high-compressed video data is stored in the high-compressed video data storing unit 23. In this case, the selecting unit 33 is controlled by the control unit 35 to select the high-compressed video data transmitted from the compressing unit 13.

Accordingly, because any compressed video data is not transmitted from the surveillance camera apparatus 31 to the surveillance apparatus 21 in cases where any unusual condition does not occur in the surveillance area, a communication traffic in the communication line 36 can be reduced, and a watchman is not required to watch the surveillance area. That is, a watching burden on the watchman can be reduced.

Also, even though a communication between the surveillance camera apparatus 31 and the surveillance apparatus 21 through the communication line 36 is not established when any unusual condition does not occur in the surveillance area, because the unusual condition detecting signal and a low-definition scene image of the surveillance area in the specific time period including the unusual condition occurring time are displayed on the monitor 26, a watchman can reliably notice the occurrence of the unusual condition in the surveillance area.

Also, because the specific high-compressed video data, of which a compression degree is the same as that of the high-compressed video data produced in the video data compressing unit 13, is transmitted through the communication line 36, a data volume of the specific high-compressed video data is not large, so that the high-compressed video data can be transmitted to the surveillance apparatus 21 at a high speed.

Thereafter, a missed scene re-displaying operation and an unusual condition occurrence operation are performed in the same manner as in the first embodiment. When the watchman inputs an operation ending request to the receiving unit 27, the communication between the surveillance camera apparatus 31 and the surveillance apparatus 21 through the communication line 36 is disconnected.

In this embodiment, only the low-compressed video data is stored in the surveillance camera apparatus 31. However, it is applicable that the high-compressed video data produced in the compressing unit 13 be stored in the video image storing unit 14 with the low-compressed video data and specific high-compressed video data in a specific time period including the unusual condition occurring time be read out from the video image storing unit 14 to be transmitted to the surveillance apparatus 21. In this case, the supplementary video data compressing unit 32 is not required.

Also, in this embodiment, a call is transmitted from the control unit 35 of the surveillance camera apparatus 31 to the control unit 28 of the surveillance apparatus 21 when the unusual condition detecting signal is received by the control unit 35, and a communication between the surveillance camera apparatus 31 and the surveillance apparatus 21 through the communication line 36 is established. However, it is applicable that a communication between the surveillance camera apparatus 31 and the surveillance apparatus 21 through the communication line 36 be also established when a communication request input by the watchman in the surveillance apparatus 21 is transmitted to the control unit 35 through a D channel of the communication line 36. In this case, after the communication line 36 is set to the communication-possible condition, the high-compressed video data produced in the compressing unit 13 is transmitted to the surveillance apparatus 21 through the communication line 36 to display a low-definition scene image of the surveillance area at real time in cases where the watchman desires to view a real time scene image, or specific high-compressed video data produced in the supplementary video data compressing unit 32 corresponding to a specific time period is transmitted to the surveillance apparatus 21 through the communication line 36 to display a low-definition scene image of the surveillance area at a past-time image in cases where the watchman desires to view a scene image in the specific time period.

Third Embodiment

In this embodiment, a plurality of surveillance cameras are arranged in a surveillance camera apparatus.

Figure 3:
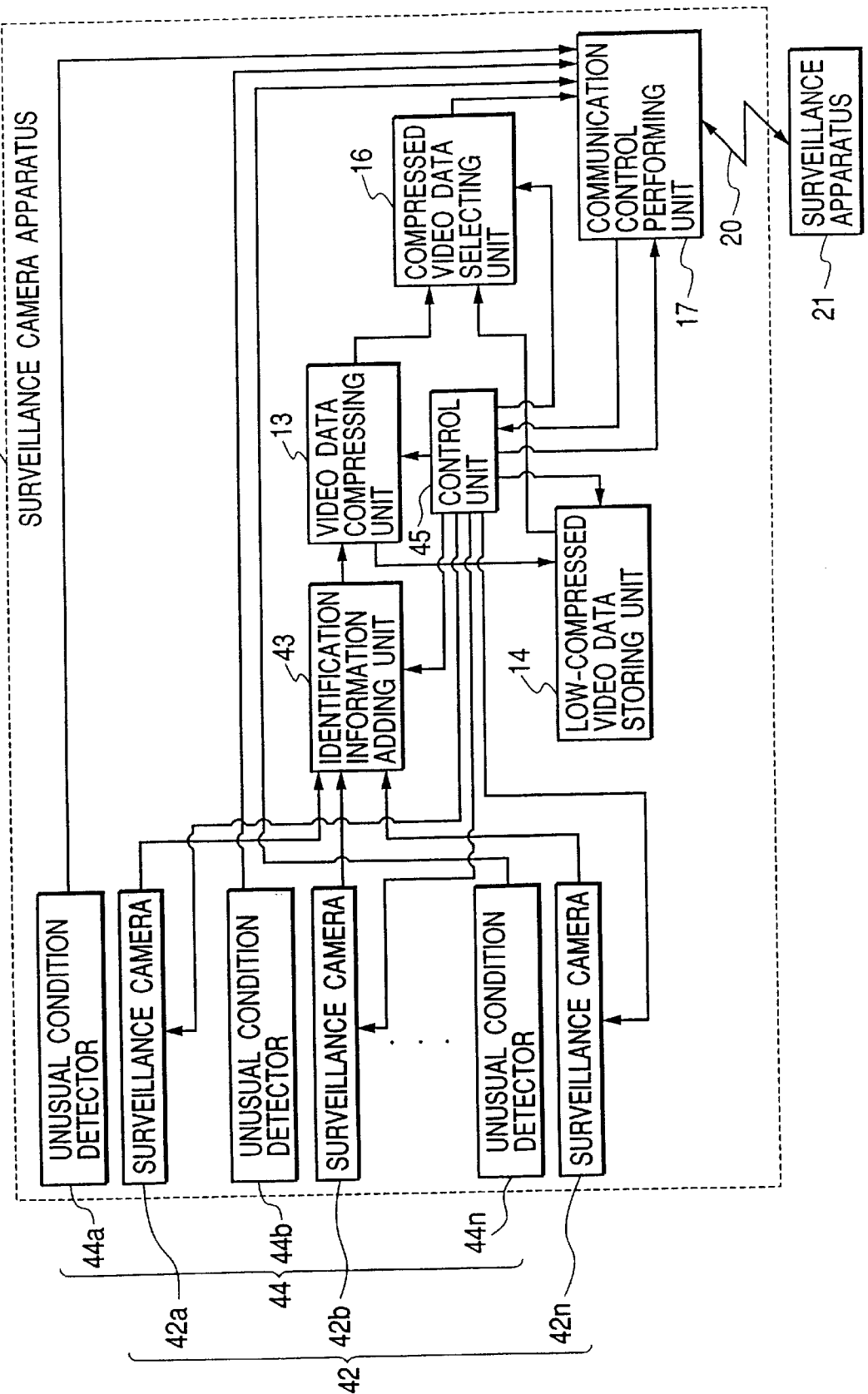
FIG. 3 is a block diagram of a remote surveillance system comprising a surveillance camera apparatus, a surveillance apparatus and a communication line according to a third embodiment of the present invention.

FIG. 3 is a block diagram of a remote surveillance system according to a third embodiment of the present invention.

As shown in FIG. 3, a remote surveillance system 40 comprises a surveillance camera apparatus 41, arranged in a surveillance zone such as a department store or a shopping center, for photographing a plurality of predetermined surveillance areas of the surveillance zone, producing video data indicating a scene of each surveillance area and detecting an unusual condition occurring in one surveillance area;

the surveillance apparatus 21, arranged in a surveillance center far from the surveillance zone, for processing the video data transmitted from the surveillance camera apparatus 41, normally displaying a low-definition scene image of each surveillance area and displaying a high-definition scene image of one surveillance area when an unusual condition occurs in the surveillance area; and the communication line 20, connecting the surveillance camera apparatus 41 and the surveillance apparatus 21, for transmitting the video data from the surveillance camera apparatus 41 to the surveillance apparatus 21.

The surveillance camera apparatus 41 comprises:

a plurality of surveillance cameras 42 (42*a*, 42*b*, - - - , and 42*n*) for always photographing the surveillance areas of the surveillance zone to produce video data of the surveillance areas;

an identification information adding unit 43 for adding identification information to the video data of the surveillance area produced in each surveillance camera 42 to distinguish the video data of each surveillance camera 42 from the video data of the other surveillance cameras 42;

the video data compressing unit 13 for compressing the video data produced in each surveillance camera 42 at a first compression degree to produced high-compressed video data and compressing the video data at a second compression degree lower than the first compression degree to produced low-compressed video data having a definition higher than that of the high-compressed video data;

the low-compressed video data storing unit 14;

a plurality of unusual condition detectors 44 (44a, 44b, - - - , and 44n), arranged in one-to-one correspondence to the surveillance cameras 42, for respectively detecting an unusual condition occurring in the surveillance area photographed by one surveillance camera 42 and outputting an unusual condition detecting signal indicating the occurrence of the unusual condition in the surveillance area;

the compressed video data selecting unit 16; the communication control performing unit 17; and a control unit 45 for adding unusual condition occurrence information to specific low-compressed video data currently produced in the video data compressing unit 13 at a current time according to the unusual condition detecting signal transmitted from the communication control performing unit 17 to record the occurrence of an unusual condition at the current time in the specific low-compressed video data currently produced and controlling operations of the surveillance cameras 42, the identification information adding unit 43, the video data compressing unit 13, the high-compressed video data storing unit 14, the compressed video data selecting unit 16 and the communication control performing unit 17 to normally transmit the high-compressed video data corresponding to the surveillance cameras 42 to the surveillance apparatus 21 through the communication line 20 and to transmit the specific low-compressed video data stored in the low-compressed video data storing unit 14 to the surveillance apparatus 21 through the communication line 20 when a high-definition scene image request is received from the surveillance apparatus 21 through the communication line 20.

In the above configuration of the surveillance camera apparatus 41 and the surveillance apparatus 21, operations performed in the remote surveillance system 40 are described.

In the surveillance camera apparatus 41, a scene of one surveillance area is always photographed by each surveillance camera 42 to obtain video data indicating the scene of the surveillance area for each surveillance camera 42, and an environmental condition of the surveillance area is always detected by each unusual condition detector 15 to check whether or not an unusual condition occurs in the surveillance area. Because video data is obtained for each surveillance camera 42, identification information such as an identification number is added to the video data of each surveillance camera 42 in the identification information adding unit 43, SO that the video data of each surveillance camera 42 can be distinguished from the video data of the other surveillance cameras 42. Thereafter, a normal operation is performed in the same manner as in the first embodiment. That is, high-compressed video data is produced from the video data of each surveillance camera 42 in the video data compressing unit 13, the high-compressed video data of the surveillance cameras 42 are transmitted to the surveillance apparatus 21 through the communication line 20, and each of a plurality of low-definition scene images of the surveillance areas is displayed with the corresponding identification information on the monitor 26. Also, low-compressed video data is produced from the video data of each surveillance camera 42 in the video data compressing unit 13, and the low-compressed video data of the surveillance cameras 42 are stored in the video image storing unit 14. Also, the high-compressed video data of the surveillance cameras 42 transmitted to the surveillance apparatus 21 are stored in the video image storing unit 23 as past compressed video data.

Accordingly, even though a plurality of low-definition scene images are displayed on the monitor 26, because identification information is added to the video data of each surveillance camera 42, the low-definition scene image of each surveillance area can be displayed with the corresponding identification information on the monitor 26, so that the watchman can reliably recognize the surveillance area corresponding to each low-definition scene image displayed on the monitor 26.

Thereafter, a missed scene re-displaying operation and an unusual condition occurrence operation are performed in the same manner as in the first embodiment.

In a missed scene re-displaying operation, in cases where the watchman misses watching a scene of a specific surveillance area corresponding to a specific surveillance camera 42 in a missing time period, the watchman inputs a missed scene request and an identification number of the specific surveillance camera 42 to the instruction receiving unit 27. Therefore, the compressed video data selecting unit 24 is controlled by the control unit 28 to select past compressed video data of the high-compressed video data storing unit 23, specific past compressed video data stored in the high-compressed video data storing unit 23 is specified by the control unit 28 on condition that the identification information added in the adding unit 43 to the video data corresponding to the specific past compressed video data matches with the identification number, and the specific past compressed video data of the missing time period is found out from the high-compressed video data storing unit 23 under the control of the control unit 28. Thereafter, the specific past compressed video data is expanded in the video data expanding unit 25, and a low-definition scene image of the specific surveillance area reproduced from the specific past compressed video data is displayed on the monitor 26 as a missed past-time image.

Accordingly, even though the watchman misses watching a scene of one surveillance area, because identification information is added to the video data in the adding unit 43, the specific past compressed video data corresponding to the surveillance area can be automatically specified, the watchman can view a low-definition scene image of the surveillance area later.

In an unusual condition occurrence operation, in cases where an unusual condition occurring in the surveillance area of a specific surveillance camera 42 is detected by a specific unusual condition detector 44, an unusual condition detecting signal indicating the occurrence of the unusual condition is output to the communication control performing unit 17, and the unusual condition detecting signal is transmitted to the control unit 45. When the unusual condition detecting signal is received in the control unit 45 at a current time, specific low-compressed video data currently produced in the video data compressing unit 13 is specified by the control unit 45 on condition that the identification information added in the adding unit 43 to the video data corresponding to the specific low-compressed video data matches with the identification number, and unusual condition occurrence information is added to the specific low-compressed video data to record the occurrence of an unusual condition at the current time in the specific low-compressed video data, and the specific low-compressed video data with the unusual condition occurrence information is stored in the low-compressed video data storing unit 14.

Also, the unusual condition detecting signal is transmitted to the surveillance apparatus 21, and the unusual condition detecting signal is immediately displayed with the low-definition scene image of the surveillance area and the identification information of the specific surveillance camera 42 on the monitor 26. Therefore, the watchman can recognize the occurrence of the unusual condition in the surveillance area photographed by the specific surveillance camera 42. When the watchman inputs a high-definition scene image request and an identification number of the specific surveillance camera 42 to the instruction receiving unit 27, the high-definition scene image request and the identification number are transmitted to the control unit 45 of the surveillance camera apparatus 41, the specific low-compressed video data corresponding to the unusual condition is found out from the low-compressed video data storing unit 14 according to the high-definition scene image request and the identification number and is transmitted to the surveillance apparatus 21. In the surveillance apparatus 21, the specific low-compressed video data is expanded in the video data expanding unit 25, and a high-definition scene image of the surveillance area reproduced from the specific low-compressed video data is displayed on the monitor 26 as a past high-definition image corresponding to the unusual condition.

Accordingly, even though a plurality of scene images are displayed on the monitor 26 when an unusual condition occurs in the surveillance area photographed by a specific surveillance camera 42, because an unusual condition detecting signal and the identification information of the specific surveillance camera 42 are immediately displayed with the low-definition scene image of the surveillance area on the monitor 26, the watchman can reliably recognize the specific surveillance camera 42 corresponding to the unusual condition.

Also, because the identification information is added to the video data produced in each surveillance camera 42 in the adding unit 43, the low-compressed video data with the identification information can be stored in the high-compressed video data storing unit 14 for each surveillance camera 42. Therefore, when the watchman inputs an identification number of the specific surveillance camera 42 to the receiving unit 27, the specific low-compressed video data corresponding to the unusual condition can be easily found out from the low-compressed video data storing unit 14, and a high-definition scene image of the surveillance area reproduced from the specific low-compressed video data can be reliably displayed on the monitor 26.

In this embodiment, the high-compressed video data of the surveillance cameras 42 are simultaneously transmitted to the surveillance apparatus 21 through the communication line 20. However, in cases where a data volume of the high-compressed video data of the surveillance cameras 42 is too large to transmit the high-compressed video data through the communication line 20 at a high speed, it is applicable that the high-compressed video data of the surveillance cameras 42 be transmitted through the communication line 20 one by one.

Also, a plurality of low-definition scene images are simultaneously displayed on the monitor 26 in this embodiment. However, it is applicable that the low-definition scene images be displayed on the monitor 26 one by one at prescribed time intervals.

Also, the identification information of the specific surveillance camera 42 is displayed with the unusual condition detecting signal on the monitor 26 in this embodiment. However, in cases where the specific surveillance camera 42 corresponding to the unusual condition detecting signal displayed with the low-definition scene image of the surveillance area can be specified without displaying the identification information, the display of the identification information on the monitor 26 is not required.

Also, one unusual condition detector 44 is arranged for each surveillance camera 42 in this embodiment. However, it is applicable that one unusual condition detector 44 be arranged for all surveillance cameras 42. In this case, the unusual condition detecting signal is displayed with each low-definition scene image on the monitor 26, so that the watchman can notice the occurrence of the unusual condition in the surveillance zone. Therefore, when the watchman inputs a high-definition scene image request, a plurality of high-definition scene images reproduced from specific low-compressed video data corresponding to the surveillance cameras 42 are displayed on the monitor 26.

Also, in this embodiment, a communication between the surveillance camera apparatus 41 and the surveillance apparatus 21 is performed through the communication line 20 used in the first embodiment. However, as shown in FIG. 4, it is applicable that a communication between a surveillance camera apparatus 51 and the surveillance apparatus 21 be performed through the communication line 36 used in the second embodiment. In this case, when an unusual condition is detected by one of the unusual condition detectors 44, a communication between the surveillance camera apparatus 51 and the surveillance apparatus 21 through the communication line 36 is established.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A remote surveillance system, comprising:
   a surveillance camera apparatus for producing compressed video data indicating a scene of a surveillance area;
   a surveillance apparatus for displaying the scene image of the surveillance area according to the compressed video data produced by the surveillance camera apparatus; and
   a communication line through which the compressed video data produced by the surveillance camera apparatus is transmitted to the surveillance apparatus, wherein the surveillance camera apparatus comprises:
   photographing means for photographing the surveillance area to produce the video data;
   video data compressing means for compressing the video data produced by the photographing means at a first compression degree to produce high-compressed video data and compressing the video data at a second compression degree lower than the first compression degree to produce low-compressed video data;

compressed video data storing means for storing the low-compressed video data produced by the video data compressing means; and communication performing means for transmitting the high-compressed video data produced by the video data compressing means to the surveillance apparatus through the communication line or transmitting the low-compressed video data stored in the compressed video data storing means to the surveillance apparatus through the communication line, and the surveillance apparatus comprises:

communication performing means for receiving the high-compressed video data or the low-compressed video data transmitted from the surveillance camera apparatus through the communication line;

compressed video data expanding means for expanding the high-compressed video data or the low-compressed video data received by the communication performing means to produce expanded video data;

displaying means for displaying a low-definition scene image of the surveillance area according to the expanded video data produced from the high-compressed video data by the compressed video data expanding means as a real time image or displaying a high-definition scene image of the surveillance area according to the expanded video data produced from the low-compressed video data by the compressed video data expanding means as a past-time image;

instruction receiving means for receiving an instruction for displaying a high-definition scene image; and control means for controlling the surveillance camera apparatus to normally output the high-compressed video data compressed by the video data compressing means and to output the low-compressed video data stored in the compressed video data storing means in cases where the instruction for displaying a high-definition scene image is received by the instruction receiving means.

2. A remote surveillance system according to claim 1 in which the surveillance camera apparatus further comprises:

unusual condition detecting means for detecting an unusual condition occurring in the surveillance area; and control means for controlling the communication performing means to output unusual condition detecting information to the surveillance apparatus in cases where the unusual condition is detected by the unusual condition detecting means, the unusual condition detecting information output by the communication performing means being displayed by the displaying means.

3. A remote surveillance system according to claim 2 in which unusual condition occurrence information being added to specific low-compressed video data currently produced by the video data compressing means under the control of the control means of the surveillance camera apparatus in cases where the unusual condition is detected by the unusual condition detecting means, the specific low-compressed video data with the unusual condition occurrence information being read out from the compressed video data storing means under the control of the control means of the surveillance camera apparatus and being transmitted to the surveillance apparatus to display the high-definition scene image of the surveillance area by the displaying means in cases where the instruction for displaying a high-definition scene image is received by the instruction receiving means.

4. A remote surveillance system according to claim 1 in which the surveillance apparatus further comprises:

compressed video data storing means for storing the high-compressed video data received by the communication performing means as past compressed video data, the past compressed video data being expanded to expanded past compressed video data by the compressed video data expanding means in place of the high-compressed video data received by the communication performing means under the control of the control means in cases where an instruction for displaying a past-time scene image is received by the instruction receiving means, and a scene image of the surveillance area reproduced from the expanded past compressed video data being displayed by the displaying means as a past-time image.

5. A remote surveillance system according to claim 1 in which the communication line is normally set to a communication-impossible condition to prohibit the transmission of the high-compressed video data and the low-compressed video data performed by the surveillance camera apparatus, the communication-impossible condition of the communication line is changed to a communication-possible condition by the control means to make the surveillance camera apparatus transmit the high-compressed video data or the low-compressed video data in cases where a communication request and a specific time period are received by the instruction receiving means, and the surveillance camera apparatus further comprises:

supplementary video data compressing means for compressing the low-compressed video data stored in the compressed video data storing means to high-compressed video data of which a compression degree is the same as that of the high-compressed video data produced by the video data compressing means; and control means for controlling the supplementary video data compressing means to read out specific low-compressed video data corresponding to the specific time period from the compressed video data storing means and to produce specific high-compressed video data by compressing the specific low-compressed video data, in cases where the communication line is set to the communication-possible condition, the specific high-compressed video data being transmitted to the surveillance apparatus through the communication line, and a low-definition scene image of the surveillance area reproduced from the specific high-compressed video data being displayed by the displaying means as a past-time image.

6. A remote surveillance system according to claim 1 in which the communication line is normally set to a communication-impossible condition to prohibit the transmission of the high-compressed video data and the low-compressed video data performed by the surveillance camera apparatus, and the surveillance camera apparatus further comprises:

supplementary video data compressing means for compressing the low-compressed video data stored in the compressed video data storing means to high-compressed video data of which a compression degree is the same as that of the high-compressed video data produced by the video data compressing means;

unusual condition detecting means for detecting an unusual condition occurring in the surveillance area; and control means for controlling the communication performing means to transmit unusual condition detecting information to the surveillance apparatus in cases where the unusual condition is detected by the unusual condition detecting means, changing the communication-impossible condition of the communication line to a communication-possible condition in cases where the unusual condition is detected by the unusual condition detecting means, controlling the supplementary video data compressing means to read out specific low-compressed video data corresponding to a specific time period including an occurrence time of the unusual condition from the compressed video data storing means and to produce specific high-compressed video data by compressing the specific low-compressed video data and controlling the communication performing means of the surveillance camera apparatus to transmit the specific high-compressed video data to the surveillance apparatus through the communication line set to the communication-possible condition in cases where the unusual condition is detected by the unusual condition detecting means, the unusual condition detecting information transmitted to the surveillance apparatus being displayed with a low-definition scene image of the surveillance area reproduced from the specific high-compressed video data by the displaying means to notify a watchman of the occurrence of the unusual condition.

7. A remote surveillance system according to claim 1 in which the photographing means comprises:

a plurality of surveillance cameras for respectively photographing one surveillance area to produce video data indicating a scene of the surveillance area; and an identification information adding unit for adding identification information to the video data of the surveillance area produced in each surveillance camera to distinguish the video data produced in each surveillance camera from the video data produced in the other surveillance cameras, the high-compressed video data with the identification information corresponding to each surveillance camera being transmitted from the surveillance camera apparatus to the surveillance apparatus to display a low-definition scene image as a real-time image by the displaying means for each surveillance camera.

8. A surveillance camera apparatus, comprising:

photographing means for photographing a surveillance area to produce video data indicating a scene of the surveillance area;

video data compressing means for compressing the video data produced by the photographing means at a first compression degree to produce highly compressed video data and compressing the video data at a second compression degree, lower than the first compression degree, to produce lower compressed video data;

video data storing means for storing the lower compressed video data produced by the video data compressing means;

communication performing means for transmitting the highly compressed video data produced by the video data compressing means to an external apparatus through a communication system to make the external apparatus reproduce a lower definition scene image of the surveillance area in real time or transmitting the lower compressed video data stored in the compressed video data storing means to the external apparatus through the communication line to make the external apparatus reproduce a high definition past time scene image of the surveillance area;

control means for controlling the communication performing means to normally transmit the highly compressed video data and to transmit the lower compressed video data in cases where a request for transmitting the lower compressed video data is received;

unusual condition detecting means for detecting an unusual condition occurring in the surveillance area and outputting an unusual condition detecting signal to the control means to cause the transmission of the lower compressed video data stored in the compressed video data storing means to the external apparatus in place of the highly compressed video data under the control of the control means; and compressed video data selecting means for normally selecting the highly compressed video data produced by the video data compressing means under the control of the control means and selecting the lower compressed video data stored in the compressed video data storing means under the control of the control means in cases where the unusual condition detecting signal of the unusual condition detecting means is sent to the control means, wherein the highly compressed video data or the lower compressed video data selected by the compressed video data selecting means is transmitted to the external apparatus by the communication performing means.

9. A surveillance camera apparatus comprising:

photographing means for photographing a surveillance area to produce video data indicating a scene of the surveillance area;

video data compressing means for compressing the video data produced by the photographing means at a first compression degree to produce highly compressed video data and compressing the video data at a second compression degree lower than the first compression degree to produce lower compressed video data;

compressed video data storing means for storing the lower compressed video data produced by the video data compressing means;

communication means for:
  transmitting the highly compressed video data produced by the video data compressing means to an external apparatus through a communication system to enable the external apparatus to reproduce a lower definition scene image of the surveillance area in real time; or
  transmitting the lower compressed video data stored in the compressed video data storing means to the external apparatus through the communication system to enable the external to reproduce a higher definition past time scene image of the surveillance area;

control means for controlling the communication means to normally transmit the highly compressed video data and to transmit the lower compressed video data in cases where a request for transmitting the lower compressed video data is received; and unusual condition detecting means for detecting an unusual condition occurring in the surveillance area and outputting an unusual condition detecting signal to the control means to transmit the lower compressed video data stored in the compressed video data storing means to the external apparatus in place of the highly compressed video data under the control of the control means;

wherein said unusual condition occurrence information is added to specific lower compressed video data currently produced by the video data compressing means under the control of the control means in cases where the unusual condition detecting signal output from the unusual condition detecting means is received by the control means, and wherein the specific lower compressed video data with the unusual condition occurrence information is detected from the compressed video data storing means by the control means in cases where the request for transmitting the lower compressed video data is received by the control means.

10. A surveillance camera apparatus, comprising:

photographing means for photographing a surveillance area to produce video data indicating a scene of the surveillance area;

video data compressing means for compressing the video data produced by the photographing means at a first compression degree to produce highly compressed video data and compressing the video data at a second compression degree, lower than the first compression degree, to produce lower compressed video data;

compressed video data storing means for storing the lower compressed video data produced by the video data compressing means;

communication means for:
   transmitting the highly compressed video data produced by the video data compressing means to an external apparatus through a communication system to enable the external apparatus to reproduce a lower definition scene image of the surveillance area in real time; or
   transmitting the lower compressed video data stored in the compressed video data storing means to the external apparatus through the communication system to enable the external apparatus to reproduce a higher definition past time scene image of the surveillance area;

control means for controlling the communication means to normally transmit the highly compressed video data and/or to transmit the lower compressed video data in cases where a request for transmitting the lower compressed video data is received;

unusual condition detecting means for detecting an unusual condition occurring in the surveillance area and outputting an unusual condition detecting signal to the control means to transmit the lower compressed video data stored in the compressed video data storing means to the external apparatus in place of the higher compressed video data under the control of the control means; and a communication system through which the highly compressed video data produced by the video data compressing means and the lower compressed video data stored in the compressed video data storing means are transmitted to the external apparatus, wherein the communication system is normally set to a communication-impossible condition to prohibit the transmission of the highly compressed video data and the lower compressed video data by the communication means, and wherein the communication-impossible condition of the communication system is changed to a communication-possible condition by the control means to make the communication performing means transmit the higher compressed video data and the lower compressed video data in cases where the unusual condition detecting signal output from the unusual condition detecting means is received by the control means.

11. A surveillance camera apparatus, comprising:

photographing means for photographing a surveillance area to produce video data indicating a scene of the surveillance area;

video data compressing means for compressing the video data produced by the photographing means at a first compression degree to produce highly compressed video data and compressing the video data at a second compression degree, lower than the first compression degree, to produce lower compressed video data;

compressed video data storing means for storing the lower compressed video data produced by the video data compressing means;

communication means for:
   transmitting the highly compressed video data produced by the video data compressing means to an external apparatus through a communication system to enable the external apparatus to reproduce a lower definition scene image of the surveillance area in real time; or
   transmitting the lower compressed video data stored in the compressed video data storing paeans to the external apparatus through the communication system to enable the external apparatus to reproduce a higher definition past-time scene image of the surveillance area;

control means for controlling the communication means to normally transmit the highly compressed video data and to transmit the lower compressed video data in cases where a request for transmitting the lower compressed video data is received;

unusual condition detecting means for detecting an unusual condition occurring in the surveillance area and outputting an unusual condition detecting signal to the control means to transmit the lower compressed video data stored in the compressed video data storing means to the external apparatus in place of the highly compressed video data under the control of the control means; and supplementary video data compressing means for reading out:
   first, the lower compressed video data produced by the video data compressing means at the occurrence time of the unusual condition detected by the unusual condition detecting means,
   second, the lower compressed video data produced by the video data compressing means just before the production of the first lower compressed video data; and
   third, the lower compressed video data produced by the video data compressing means just after the production of the first lower compressed video data from the compressed video data storing means under the control of the control means and compressing the first lower compressed video data, the second low compressed video data and the third lower compressed video data to produce specific compressed video data, having a compression degree that is the same as that of the highly compressed video data produced by the video data compressing means, in cases where the unusual condition detecting signal output from the unusual condition detecting means is received by the control means, wherein the specific compressed video data being transmitted to the external apparatus by the communication means, under the control of the control means, to enable the external apparatus to reproduce a lower definition past time scene image of the surveillance area.

12. A surveillance camera apparatus, comprising:

photographing means for photographing a surveillance area to produce video data indicating a scene of the surveillance area;

video data compressing means for compressing the video data produced by the photographing means at a first compression degree to produce highly compressed video data and compressing the video data at a second compression degree, lower than the first compression degree, to produce lower compressed video data;

compressed video data storing means for storing the lower compressed video data produced by the video data compressing means;

communication means for:
  transmitting the highly compressed video data produced by the video data compressing means to an eternal apparatus through a communication system to enable the external apparatus to reproduce a lower definition scene image of the surveillance area in real time; or
  transmitting the lower compressed video data stored in the compressed video data storing means to the external apparatus through the communication system to enable the external apparatus to reproduce a high definition past-time scene image of the surveillance area;

control means for controlling the communication means to normally transmit the highly compressed video data and to transmit the lower compressed video data in cases where a request for transmitting the lower compressed video data is received;

unusual condition detecting means for detecting an unusual condition occurring in the surveillance area and outputting an unusual condition detecting signal to the control means to cause the transmission of the lower compressed video data stored in the compressed video data storing means to the external apparatus in place of the highly compressed video data under a control of the control means;

a communication system adapted to transmit the highly compressed video data, produced by the video data compressing means, and the lower compressed video data, stored in the compressed video data storing means, to the external apparatus, wherein the communication system is normally set to a communication-impossible condition in order to prohibit the transmission of the highly compressed video data and the lower compressed video data; and wherein the communication-impossible condition of the communication line is adapted to be changed to a communication-possible condition by the control means, whereby to cause the communication performing means to transmit the highly compressed video data and the lower compressed video data in cases where the unusual condition detecting signal output from the unusual condition detecting means is received by the control means; and supplementary video data compressing means for reading out:
  first, the lower compressed video data produced by the video data compressing means at the time that the unusual condition was detected by the unusual condition detecting means,
  second, the lower compressed video data produced by the video data compressing means just before the production of the first lower compressed video data; and
  third, the lower compressed video data produced by the video data compressing means just after the production of the first lower compressed video data from the compressed video data storing means under a control of the control means, and means for compressing the first lower compressed video data, the second lower compressed video data and the third lower compressed video data to produce specific compressed video data having a compression degree that is the same as that of the highly compressed video data produced by the video data compressing means;

wherein, in cases where the unusual condition detecting signal output from the unusual condition detecting means is received by the control means, means for transmitting the specific compressed video data that has been transmitted to the external apparatus by the communication means through the communication system set to the communication-possible condition, whereby enabling the external apparatus to reproduce a lower definition past-time scene image of the surveillance area.

\* \* \* \* \*